United States Patent [19]

Miller

[11] Patent Number: 4,549,844
[45] Date of Patent: Oct. 29, 1985

[54] ROLLER BED VEHICLE

[76] Inventor: Thomas P. Miller, 601 N. Brown St., Mt. Pleasant, Mich. 48858

[21] Appl. No.: 566,151

[22] Filed: Dec. 27, 1983

[51] Int. Cl.[4] .............................................. B60P 1/52
[52] U.S. Cl. ................................ 414/534; 193/35 SS; 414/535
[58] Field of Search ....................... 414/529, 532–535; 193/35 SS

[56] References Cited

U.S. PATENT DOCUMENTS 559,552  5/1896  Turner .................................. 414/534
3,011,665  12/1961  Wise ..................................... 414/535
3,447,665  6/1969  Egeland et al. ................. 414/534 X Primary Examiner—Robert G. Sheridan
Attorney, Agent, or Firm—Michael L. Bauchan

[57] ABSTRACT

A roller bed vehicle is provided which includes selectively elevatable rollers positioned in openings in a vehicle load carrying bed. A roller actuator mechanism array selectively raises and lowers the rollers so that a load may slide across the raised rollers to load and unload onto the bed and the rollers may be lowered below the bed top surface to facilitate the load resting on the bed when transported by the vehicle.

5 Claims, 3 Drawing Figures

ROLLER BED VEHICLE

SUMMARY OF THE INVENTION

This invention relates to vehicles having a load carrying bed and is particularly suitable to trucks and trailers of a "flat bed" type. An array of roller receiving openings is provided in the load carrying bed and an array of retractable rollers are provided in the openings. A roller actuator mechanism array positioned below the bed selectively raises and lowers the rollers so the rollers selectively are above and below the bed. The elevatable rollers are raised above the bed to facilitate sliding a load onto the bed. The elevatable rollers are lowered below the top surface of the bed at all times except when the load is being loaded or unloaded so the load is supported by the upper bed surface except when loading or unloading the load onto the bed.

BACKGROUND OF THE INVENTION

Trucks and trailers having a flat load carrying bed are in common usage. The load carried by such vehicles is often a standardized enclosure having a rectangular cross section, irregular shaped objects on a standardized pallet, or pipes positioned on a standardized basket. Numerous other types of load configurations are commonly used.

Trucks and trailers having a flat load carrying bed commonly utilize a rear roller which extends slightly above the vehicle bed and has an axis at right angles to the horizontal direction in which a load is slid onto the vehicle bed. The load extends rearward over the roller at all times and the front of the load rests on the vehicle bed. However, friction between the vehicle bed and the middle and front portions of the load often make it difficult to load and unload the bed. There have been some proposals to reduce friction between the load and the load carrying surface of the vehicle or transportation system. For example, Campos U.S. Pat. No. 2,812,080 is a patent in which an entire bed is raised and lowered to expose and retract rollers which project through openings in the bed. Campos uses very complex apparatus and the lift mechanism would have to bear the weight of the load while transporting the load with the bed raised to have retracted rollers. Langley et al U.S. Pat. No. 3,439,790 is a patent which provides apparatus for lifting a load above a conveyor to prevent damage in transit. Langley uses pneumatic tubes which are inflated and which would tend to deflate during transit if they contained leaks. Achammer U.S. Pat. No. 3,228,542 is a patent in which pivoting links are employed to lift and lower loads relative to rolls, which like Campos necessitates supporting the load weight on the lift mechanism when transporting the load. Seper U.S. Pat. No. 3,549,035 is a patent in which fork lift tines utilize roller bearings on inserts to reduce friction between the tine and a load and a floor but such a device is not practical in a flat bed truck or trailer nor functionally similar to the subject invention.

It is thus an object of this invention to provide a roller bed vehicle in which rollers may be selectively extended through the bed of the vehicle to facilitate loading and unloading and may be retracted so the vehicle bed carries the load weight while transporting the vehicle and to provide a unique roller actuator mechanism array which selectively controls the elevation of rollers under the load.

DISCUSSION OF THE DRAWINGS

The subject invention will become apparent from the accompanying description and drawings in which.

DESCRIPTION OF THE PREFERRED EMBODIMENT

Figure 1:
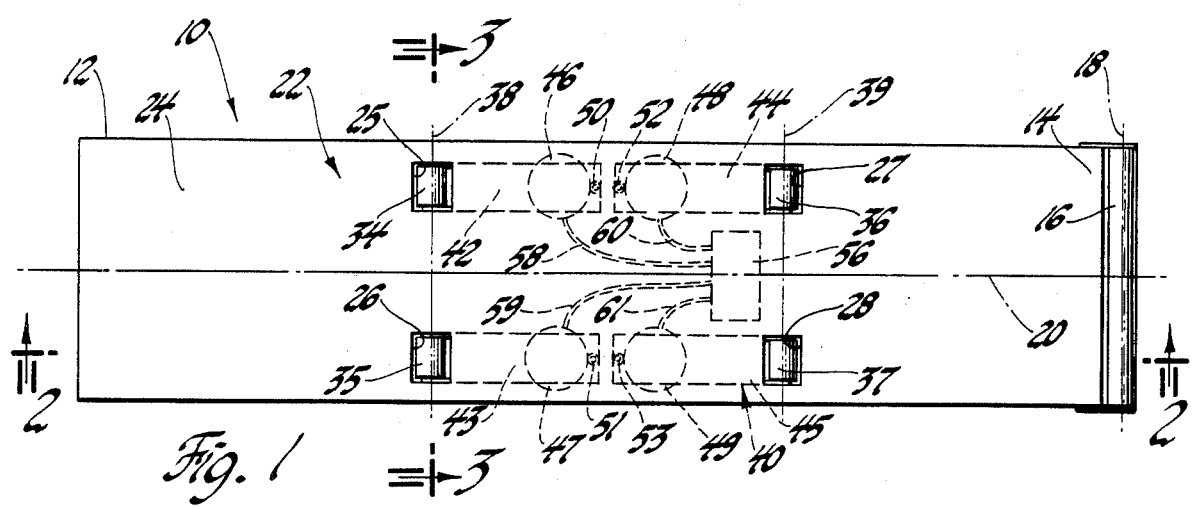
FIG. 1 is a top plan view of a roller bed vehicle embodying the principles of the subject invention.

As shown in FIG. 1, a roller bed vehicle 10 is illustrated of the type commonly called a trailer. The trailer has a front end 12 and a rear end 14 on which is rigidly attached a roller 16 defined by an axis 18 at right angles to the vehicle axis 20.

The trailer 10 includes a load carrying bed having an upper surface 24 on top of the trailer 10 in which an array of roller receiving openings 25 through 28 are provided in the form of rectangular holes.

Figure 2:
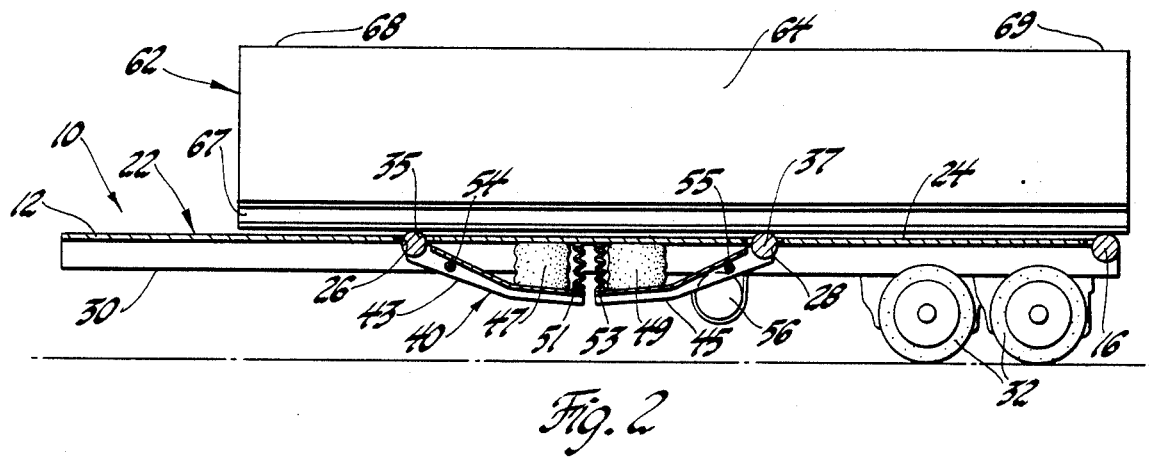
FIG. 2 is a sectional view of the roller bed vehicle in FIG. 1 taken along lines 2—2 with a typical load illustrated.
Figure 3:
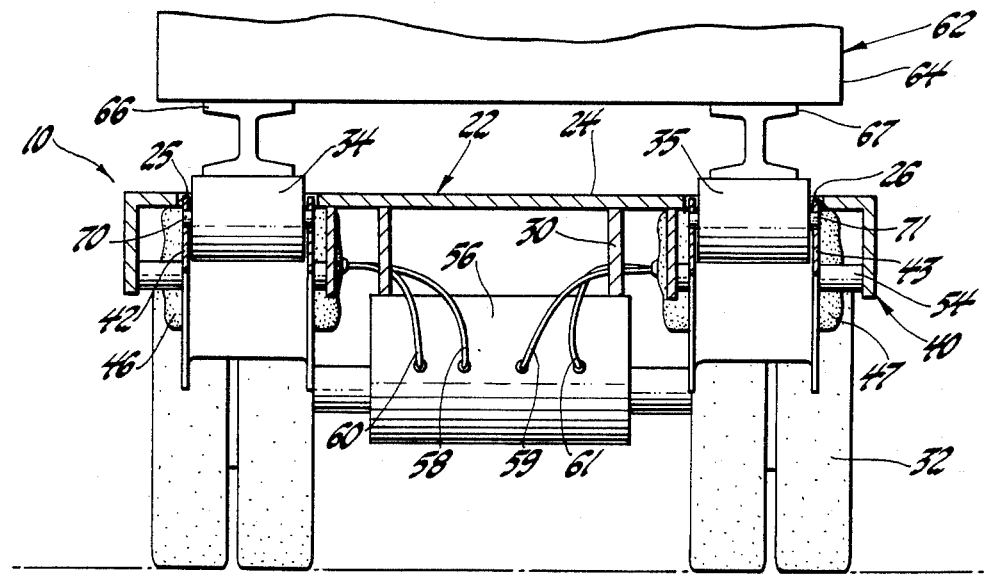
FIG. 3 is a sectional view of the roller bed vehicle in FIG. 1 taken along lines 3—3 with a typical load illustrated.

As shown in FIGS. 2 and 3, the bed 22 also includes a frame 30 to which is attached a wheel assembly 32 for supporting the bed 22 as it travels on the ground.

An array of elevatable rollers 34 through 37 is provided with one of the rollers 34 through 37 positioned in each of the holes 25 through 28 as shown in FIG. 1 with the rollers 34 and 35 sharing a common axis 38 and rollers 36 and 37 showing a common axis 39. Axes 38 and 39 are at right angles to vehicle axis 20 and rollers 34-37 are independently supported.

A roller actuator mechanism array 40 is illustrated in FIGS. 2 and 3 and includes an array of actuator arms 42 through 45 and an array of selectively energizable actuators which include air bags 46 through 49 and springs 50 through 53 of a tensile type. The actuator arms 42 through 45 are pivotally attached to the frame 30 of the bed 22, the pivots 54 and 55 of actuator arms 43 and 45 being illustrated in FIG. 2 and identical pivots at identical locations being provided on the actuator arms 42 and 44.

Energization of the air bags 46 through 49 is accomplished by means of a compressed air source 56 which comprises a single tank containing a diesel, gas or electric air compressor and air reservoir and which is connected through pneumatic lines 58 through 61 to the air bags 46 through 49. The air bags 46 through 49 used as pneumatic actuators in the illustrated embodiment are commonly available from many manufacturers, including Goodyear Tire and Rubber Company and Firestone Tire and Rubber Company and are of a type commonly used to provide cushioning between a vehicle axle and the vehicle body or frame. The nature of these actuators and the associated pneumatic equipment, including air source 56 and pneumatic lines 58 through 61, are so well known that further detailed description of these items is unnecessary to persons versed in the art.

In the illustrated embodiment a load 62 is illustrated in FIGS. 2 and 3. The load includes a rectangular box 64 supported by "I-Beams" 66 and 67 rigidly secured to the underside of the box 64. The load 62 may be any of numerous standardized cargo container types with I-Beams 66 and 67 spaced a certain predetermined distance in the manner which is known to persons versed in the art, which is commonly provided for expeditious load handling by means of such heavy equipment as fork lift trucks by persons versed in the art.

As shown in FIGS. 2 and 3, the load 62 is placed on the vehicle 10 by sliding the load 62 in a first substantially horizontal direction along vehicle axis 20 beginning at rear end 14 of the vehicle 10. As the front 68 of the load 62 is placed on rear roller 16, which is of a conventional design commonly used by persons versed in the art, rear roller 16 expedites the horizontal movement of load 62 toward the front end 12 of the vehicle 10. Rear roller 16 extends slightly above the upper surface 24 of the bed 22 to prevent I-Beams 66 and 67 sliding on the bed 22 at the rear end 14 of the vehicle 10.

While loading and unloading a load on and off the vehicle 10 the air bags 46 through 49 are actuated so as to be fully extended and press downward on actuator arms 42 through 45 with greater force than the tensile springs 50 through 53 exert on actuator arms 42 through 45. Each of the actuator arms 42 through 45 are thus pivoted about the pivots which hold each of the actuator arms 42 through 45 on the frame 30. In FIG. 2 it is apparent that air bag 47 when extended presses against both the bottom of the bed 22 and actuator arm 43 pivoting actuator arm 43 in a clockwise direction and when air bag 49 is extended it presses against the bottom of the bed 22 and actuator arm 45 so as to pivot actuator arm 45 in a counter-clockwise direction. Persons versed in the art will appreciate that similar movement occurs in actuator arms 42 and 44 when air bags 46 and 48 are extended. Persons versed in the art will also appreciate that repositioning the elements of the roller actuator mechanism array 40 could be easily accomplished to have all of the actuator arms 42 through 45 pivot in the same direction when the air bags are extended without departing from the spirit of the invention. The illustrated embodiment is presented as shown because the particular vehicle 10 illustrated has a wheel assembly 32 positioned near the rear end 14 of the vehicle and thus having actuator arms 42 through 45 positioned as shown is a compact design to extend a short distance along the vehicle axis 20.

While loading and unloading the load 62 with the air bags 46 through 49 extended, it is thus apparent that the rollers 34 through 37 extend above the upper surface 24 of the bed 22. Therefore as the load 62 slides forward I-Beams 66 and 67 extend onto rollers 36 and 37 while rear end 69 of the load 62 is still being supported by a winch or other equipment performing the loading operation. As the load 62 slides in the first horizontal direction the I-Beams 66 and 67 engage rollers 34 and 35 as the load continues to move forward until it is in the desired position. Usually the rear end 69 of the load is permitted to rest on the rear roller 16 at all times to facilitate removal of the load 62 after it is transported.

To transport the load 62 the air bags 46 through 49 are deflated. The weight of the load 62 on the rollers 34 through 37 causes the actuator arms 42 through 45 to pivot in a second predetermined direction about the respective pivotal connections to the frame so as to compress the air bags 46 through 49 until the I-Beams 66 and 67 of the load 62 rest on the upper surface 24 of the bed 22.

The tensile springs 50 through 53 are each connected to the bed 22 and one of the actuator arms 42 through 45 to pull up on the actuator arms 42 through 45 so as to compress air bags 46 through 49 and lower rollers 34 through 37 so that when the vehicle 10 is traveling across the ground loaded or unloaded the rollers 34 through 37 are lowered below the upper surface 24 of the bed 22 at all times except when the air bags 46 through 49 are inflated to elevate the rollers above upper surface 24 of bed 22 for loading and unloading the load 62. When the load 52 is to be unloaded, the air bags 46 through 49 are inflated and the load 62 is slid in a second horizontal direction rearwardly over the rear roller 16.

Persons versed in the art will appreciate that in the illustrated embodiment the actuator arms 42 through 45 are pivoted at a point near the rollers 34 through 37, which are pinned to the end of the actuator arms in the manner of pins 70 and 71 in FIG. 3. Thus a considerable mechanical advantage is provided by the long portion of the actuator arms 42 through 45 when they are pivoted by air bags 46 through 49 about the pivots such as pivots 54 and 55. It is also apparent to persons versed in the art that the rollers 34 through 37 are moved in a substantially vertical direction and only move a short distance as rollers 34 through 37 only protrude about half their diameter above the upper surface 24 of bed 22 when at their uppermost location and when at their lowermost location the roller surface of rollers 34 through 37 is still within the roller receiving openings 25 in the bed 22. As shown in FIG. 3, actuator arms 42 and 43 are made of a channel construction and are relatively wide so air bags 46 and 47 may have a large diameter. The other actuator arms and air bags are similarly constructed so that a relatively low pressure in air bags 46 through 49 exerts a large downward force on actuator arms 42 through 45 which is multiplied by the mechanical advantage of the actuator arms 42 through 45 having approximately 20% of their length between their respective pivots and the respective rollers 34 through 37 to provide a very substantial upward force on the rollers 34 through 37, which are held in the uppermost position with actuator arms 42 through 45 pressed against the underside of the bed 22 even when a relatively heavy load 62 is placed on the vehicle 10.

Persons versed in the art will appreciate that various modifications may be made of the illustrated embodiment without departing from the spirit of the invention. For example, hydraulic or electric actuators could be employed instead of the pneumatic air bags 46 through 49 and pneumatic air source 56 to move actuator arms 42 through 45.

What is claimed is:

1. A vehicle having front and rear ends connected by a vehicle axis comprising, in combination, a load bed which includes a frame and a bed top surface having at least one roller opening, a wheel assembly secured to said bed for transporting said vehicle on the ground, an end roller secured to said bed and having an axis at right angles to said vehicle axis so as to extend above said bed top surface at said rear end of said vehicle a predetermined height; an array of selectively elevatable rollers which are each defined by an axis at right angles to said vehicle axis and which are each selectively elevatable above said bed top surface and selectively lowerable below said bed top surface; and a roller actuator mechanism array which includes an array of actuator arms which are each pivotally secured to said bed and which each support one of said rollers in one of said roller openings and an array of selectively energizable actuators which selectively move each of said actuator arms about said pivots so as to selectively elevate and lower said elevatable rollers above and below said predetermined height, thereby facilitating sliding a load onto said bed in a direction substantially parallel to said vehicle axis by sliding said load across said end roller and across said elevatable rollers when said elevatable rollers are above said bed top surface and gravity assists unloading and facilitating transportation of said load by lowering said elevatable rollers below said bed top surface so as to support said load on said bed top surface and said end roller while transporting said load.

2. A vehicle comprising, in combination, a load carrying bed, said bed including a frame and a load support upper surface adapted to receive a load in a first horizontal direction and support said load in transit, said bed including at least one roller receiving opening; a wheel assembly attached to said frame for supporting said frame; a fixed roller rigidly attached to said bed so as to support a load at a predetermined height above said bed, said fixed roller having a substantially horizontal axis substantially at right angles to said first horizontal direction so as to facilitate loading and unloading said load; at least one elevatable roller substantially defined by a horizontal axis which is substantially at right angles to said first horizontal direction and parallel to said fixed roller axis, each of said elevatable rollers being positioned in one of said bed roller openings; and an elevatable roller support assembly secured to said frame for supporting each of said elevatable rollers in one of said bed roller openings and selectively moving each of said elevatable rollers in a substantially vertical direction whereby said elevatable rollers may be selectively elevated above said predetermined height when loading and unloading said load from said bed whereby said load is supported by said elevatable rollers and said fixed roller when loading and unloading said load on and off said bed and gravity assists said unloading and said load is supported by said bed upper surface and said fixed roller when said elevatable rollers are selectively lowered below said bed upper surface for transporting said load.

3. The vehicle of claim 2 in which said elevatable roller support assembly includes at least one actuator arm which is secured to said bed and which supports one of said elevatable rollers in one of said roller openings and selectively energizable actuator means which selectively moves said actuator arm so as to selectively raise and lower said one elevatable roller in one of said roller openings whereby said elevatable rollers may be selectively elevated above said bed upper surface when loading and unloading said load from said bed so as to support said load on said fixed roller and said elevatable rollers when loading and unloading said load on and off said bed and said elevatable rollers may be selectively lowered below said bed upper surface so as to support said load on said bed upper surface and said fixed roller when transporting said load.

4. A vehicle comprising, in combination, a load carrying bed, said bed including a frame and a load support upper surface adapted to receive a load in a first substantially horizontal direction and support said load in transit, said bed including at least one roller receiving opening; a wheel assembly attached to said frame for supporting said frame; a fixed roller rigidly attached to said bed so as to support a load at a predetermined height above said bed, said fixed roller having a substantially horizontal axis substantially at right angles to said first horizontal direction so as to facilitate loading and unloading said load; at least one elevatable roller substantially defined by a horizontal axis which is substantially at right angles to said first direction, each of said elevatable rollers being positioned in one of said bed roller opernings; and an elevatable roller support assembly secured to said frame for supporting each of said elevatable rollers in one of said bed roller openings and selectively moving each of said elevatable rollers in a substantially vertical direction, said elevatable roller support assembly including at least one actuator arm which supports one of said elevatable rollers in said roller opening and which is pivotally attached to said bed and a selectively extendable actuator assembly secured to said bed and to said actuator arm for rotating said actuator arm in a first direction about said pivot so as to raise said elevatable roller above said bed upper surface and for rotating said actuator arm in a second direction about said pivot so as to lower said elevatable roller below said bed upper surface whereby said elevatable rollers may be selectively elevated above said predetermined height when loading and unloading said load from said bed so as to support said load on said fixed roller and said elevatable rollers when loading and unloading said load on and off said bed and gravity assists said unloading and said elevatable rollers may be selectively lowered below said bed upper surface so as to support said load on said upper surface and said fixed roller when transporting said load.

5. Apparatus for loading and unloading a vehicle load carrying bed which includes an array of roller receiving holes over which a load is loaded and unloaded in a cerain axial direction on the top surface of said bed comprising, in combination, a fixed roller rigidly secured to said bed having a horizontal axis substantially at right angles to said axial direction and positioned at an edge of said bed so as to support said load at a predetermined height, an array of at least one elevatable roller, each of said electable rollers being defined by a axis substantially at right angles to said axial direction and being positioned in one of said roller receiving holes and an array of selectively energizable roller support mechanisms for selectively raising and lowering said elevatable rollers in said holes so as to selectively raise and lower said elevatable rollers above and below said predetermined height, said roller support mechanisms including an array of actuator arms which each support at least one of said elevatable rollers and which are each pivotally connected to said bed and also including an array of selectively energizable actuators which each are secured to said bed so as to selectively pivot said arms above said pivots, thereby selectively raising and lowering said elevatable rollers above and below said predetermined height whereby said load may be loaded and unloaded on said bed by sliding said load across said fixed roller and at least one of said elevatable rollers when said elevatable rollers are raised above said bed top surface and gravity assists said unloading and said load may be transported on said bed top surface by lowering said elevatable rollers below said bed top surface, whereby said load is supported by said bed and said fixed roller.

* * * * *

UNITED STATES PATENT AND TRADEMARK OFFICE
CERTIFICATE OF CORRECTION

PATENT NO. : 4,549,844

DATED : October 29, 1985

INVENTOR(S) : Thomas P. Miller

It is certified that error appears in the above-identified patent and that said Letters Patent is hereby corrected as shown below:

In the Abstract in line 6 after "unload" insert ---the load---.
Column 4, Line 5, change "52" to ---62---.

Signed and Sealed this

Eighteenth Day of February 1986

[SEAL]

Attest:

Attesting Officer

DONALD J. QUIGG

Commissioner of Patents and Trademarks